C. W. CARTER.
GRAIN SEPARATOR.
APPLICATION FILED MAR. 21, 1919.
1,364,247.
Patented Jan. 4, 1921.
2 SHEETS—SHEET 1.
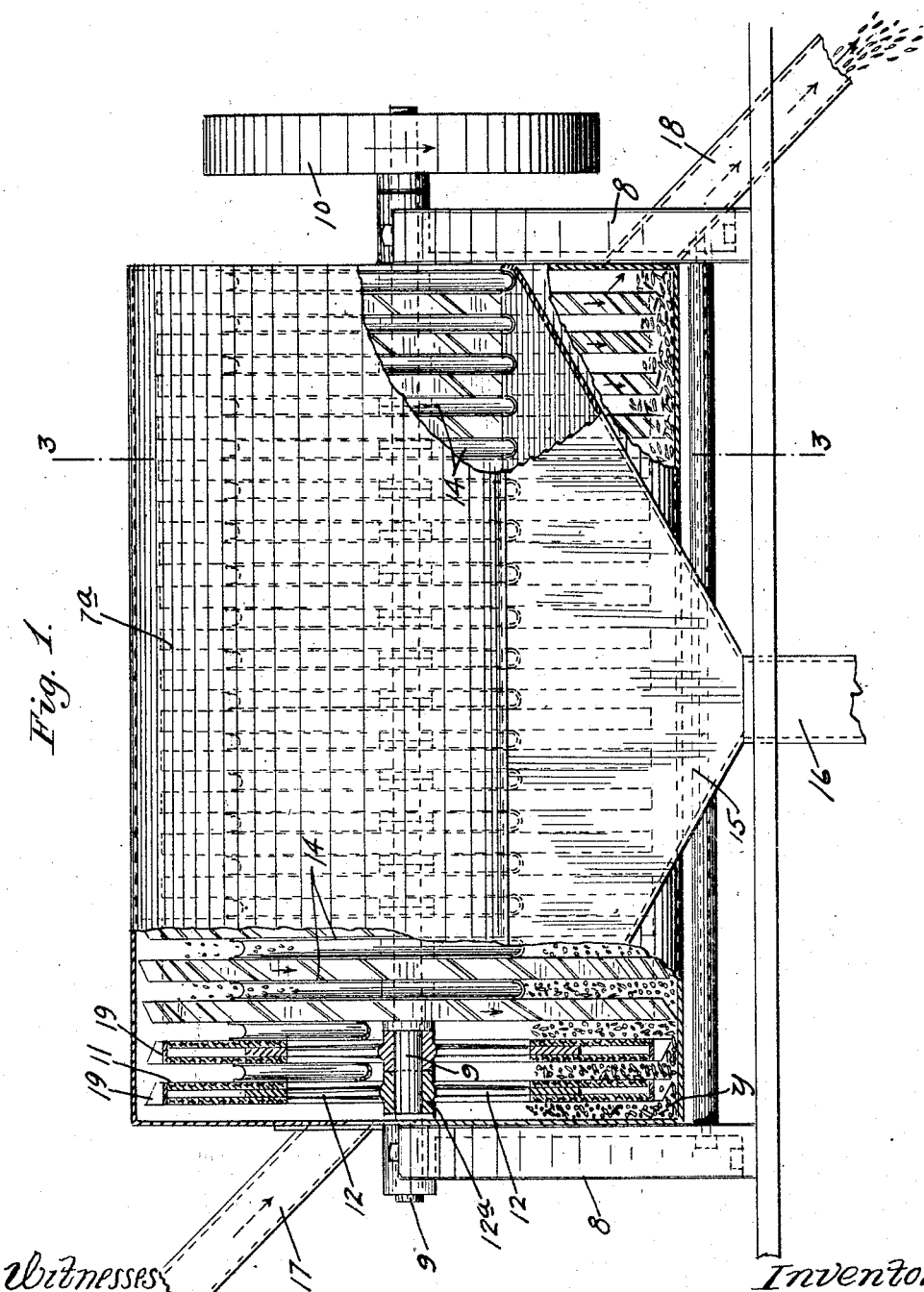
Inventor
CLARENCE W. CARTER
By his Attorneys

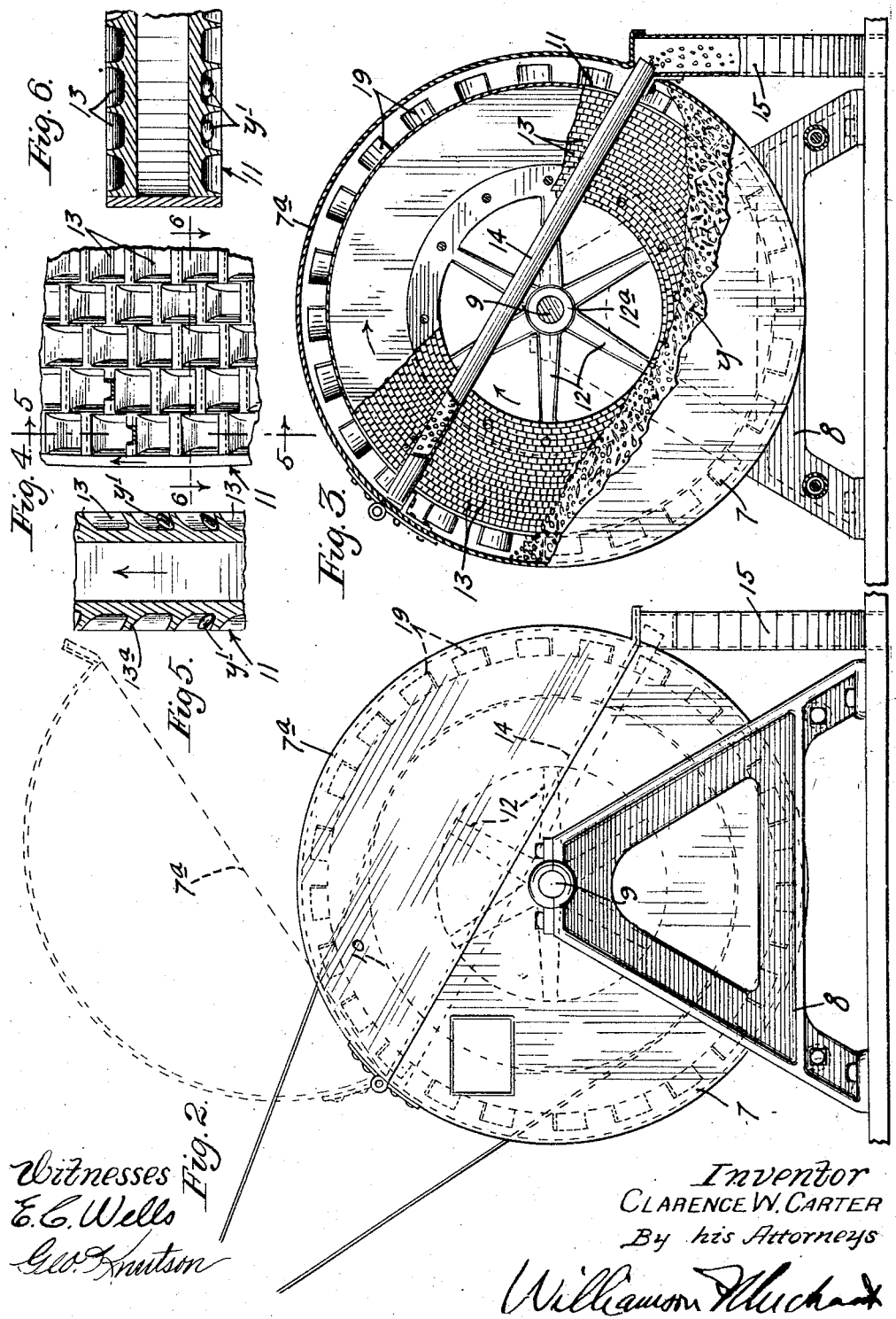

UNITED STATES PATENT OFFICE.

CLARENCE W. CARTER, OF MINNEAPOLIS, MINNESOTA.

GRAIN-SEPARATOR.

1,364,247.   Specification of Letters Patent.   Patented Jan. 4, 1921.

Application filed March 21, 1919. Serial No. 284,179.

*To all whom it may concern:*

Be it known that I, CLARENCE W. CARTER, a citizen of the United States, residing at Minneapolis, in the county of Hennepin and State of Minnesota, have invented certain new and useful Improvements in Grain-Separators; and I do hereby declare the following to be a full, clear, and exact description of the invention, such as will enable others skilled in the art to which it appertains to make and use the same.

My invention has for its object to provide an improved separator adapted generally for the separation of articles or objects of different character, and more especially those that have different lengths with approximately the same diameters. A separator of this character is therefore exceedingly well adapted for the separation of such grains as wheat and oats, or wheat and wild peas. In fact, the main object of this invention is to provide a very compact machine of large capacity for separating wheat from oats and wild peas from wheat. Oats, as is well known, have generally very much the same diameter as wheat but are much longer, and while wild peas will have approximately the same diameter as wheat, are much shorter than wheat.

These differences in the lengths of said grains make it highly feasible to provide disks or other separating surfaces with pockets that will receive and hold wheat, for example, while moving upwardly through a body of mixed wheat and oats, and at the same time, will reject or fail to receive the oats, which latter will be too long to get within the pockets, or, at least, to stay within the pockets while being elevated from the body of grain.

By partly immersing the pocketed surface of the disks in the body of grain to be separated, that is, by arranging the disks to rotate so that their pocketed surfaces, at the lower portions of the disks will continuously run through the body of grain, continuous contacting of the pockets with the wheat is insured, and by the upwardly moving portions of the disks, the wheat thus collected will be carried from the body of grain to points above the same where, by suitable means, the separation thus effected may be maintained.

A highly efficient form of the machine is illustrated in the accompanying drawings wherein like characters indicate like parts throughout the several views.

Referring to the drawings:—

Figure 1 is a view in side elevation with some parts broken away and some parts sectioned showing the improved separator;

Fig. 2 is an end elevation of the separator;

Fig. 3 is a transverse vertical section taken chiefly on the line 3—3 of Fig. 1 but with some parts of the machine shown in full;

Fig. 4 is an enlarged view showing a portion of the pocketed surface of one of the separating disks;

Fig. 5 is a fragmentary section on the line 5—5 of Fig. 4; and

Fig. 6 is a fragmentary section on the line 6—6 of Fig. 4.

As a container for the grain to be separated, I preferably employ a horizontally disposed cylindrical drum-like casing 7 rigidly supported by frame brackets 8 and provided with a hinged upper section $7^a$ which, when raised, affords access to the interior thereof. The casing 7 affords a container for the mixed grains $y$ and extending axially through said case is a shaft 9 journaled in the brackets 8 and shown as provided at one end with a pulley 10 adapting the said shaft to be rotated by a power-driven belt not shown.

The separating disks above described in a general way are secured to and carried by this shaft 9. These disks may be constructed in different ways, but for mechanical reasons are preferably made up, each of a pair of annular plates 11 secured to spokes 12 that radiate from hubs $12^a$ secured on the shaft 9. These double-faced disks are closely spaced and on their opposing faces, the disk plates 11 are formed with pockets 13. These pockets are preferably arranged in concentric rows and are closely positioned in all directions. Moreover, the pockets are of such size that they will receive and hold wheat kernels $y^1$, but are too small and short to receive and hold the longer oat kernels. It is also highly important that these pockets 13 be undercut at $13^a$, as best shown in Fig. 5, on those extremities thereof that are at the bottom or lowermost on the upwardly moving sides of the disks. These undercut portions adapt the pockets to hold the wheat kernels and carry them upward above the body of mixed grain $y$ to points where, by the action of gravity, or otherwise, they will be ejected from the raised pockets.

The pockets are preferably rectangular in face view and the three sides thereof, other than the undercut portions, are outwardly beveled, that is, made reverse to the undercut, so that raised wheat kernels may be ready to discharge, by gravity, from the upper pockets, and moreover, this beveling of the sides of the pockets facilitates the discharge from the pockets.

To catch the wheat that is discharged or falls from the raised pockets of the disks under the action of gravity, I preferably employ small inclined spouts 14 that quite closely fit between the opposing faces of the adjacent disks and extend completely across the disks in an approximately diametrical direction. These spouts, of course, are located above the body of grain $y$, and preferably, they extend above the shaft 9. At their lower ends, the spouts 14 deliver into the expanded hopperlike upper portion 15 of a spout 16, which latter will lead to a suitable point for the discharge of the collected wheat.

The mixed grain will be supplied to one end of the casing 7 preferably through an inclined spout 17, and others will be carried from the opposite end of said casing by another inclosed spout 18. To produce a progressive movement of the grain from the receiving toward the delivery end of the casing, I preferably provide the disks on their peripheries with oblique propeller blades 19.

The separating operation has probably been made clear from the foregoing statements, but may be briefly summarized as follows:

As the pocketed surfaces of the disks move through the body of grain, the grain will, of course, be pressed against the same and the pockets be loaded with wheat kernels, while the oats, being longer, will be rejected by the pockets, that is, will not enter the pockets, or not stay in the pockets if they should enter the same. Hence, on the upwardly moving sides of the disks, (the disks being rotated as shown by the arrows, Fig. 3), the wheat caught in the pockets will be carried from the body of grain upward to points above the upper portions of the spouts 14, and then, or shortly after, will, by the action of gravity, be caused to drop out of the pockets and into the troughs from whence the wheat will run into the spout hopper 15 and the separation of the wheat from the oats thus maintained.

The oats will be gradually maintained toward the delivery end of the casing and finally discharged through the spout 18. For the separation of wild peas from wheat, the pockets of the disks should be of such size as to receive the peas but to reject the wheat, which is longer; and it will, of course, be understood that for the separation of other articles or materials, the pockets in the disks must be properly designed for the particular kind of separation they are called upon to perform.

In a machine designed as described, an enormous number of pockets per unit of time can be brought into action on the grain or material to be separated, and as I have proven by experiment, an almost perfect separation can be effected.

The expression "rotary pocketed disks" is herein used in a broad sense to include approximately flat pocketed surfaces extended outward from the axis of rotation and arranged to be given more or less complete rotation in their edgewise movement through the material to be separated.

It is highly important to note that in the applicant's device the separating plates or disks are provided with pockets that are always closed at their inner sides and always open at their outer sides. With this construction, it necessarily follows that the grain or material picked up by the pockets after being raised above the body of the commingled grain or material, will be discharged from the pockets at the same side of the disk into which it is received into the pockets. Otherwise stated, the grain or material never passes completely through a disk or plate, and hence, the danger from clogging is substantially eliminated. Also this arrangement makes it feasible to taper the pockets inward so that while the grain will be freely picked up, if of proper size and shape, it will also be freely discharged from the elevated pockets.

What I claim is:

1. A separator of the kind described comprising a container for the material to be separated, and a separating plate movable edgewise upward through the body of material in said container and provided in its face with pockets that are always closed at their inner side and open at their outer sides and are arranged to receive certain kinds of material from the commingled body and to discharge the same at a point higher up but at the same side of the plate at which they were received into said pockets.

2. A separator of the kind described comprising a container for the material to be separated, and a separating plate movable upward through the body of material in said container and provided with pockets that are always closed at their inner sides and open at their outer sides and arranged to receive certain kinds of material in their movement through said material and to discharge the same at a point higher up but at the same side of the plate at which they were received into said pockets, and means operative at the side of the plate noted to receive the material from said pockets and to maintain the separation of the materials thus effected.

3. A separator of the kind described comprising a container for the material to be separated, and a plurality of closely positioned separating plates provided in their opposing faces with pockets arranged to receive certain kinds of material in their movement through the body of the material in said container, the pockets of the opposing faces of said plates discharging, at points higher up, the materials carried upward thereby, and means operative between the opposing faces of said plate to receive the material discharged from said pockets and to maintain the separation of materials thus effected.

4. A separator of the kind described comprising a container for the material to be separated, and a plurality of closely positioned separating plates provided in their faces with pockets adapted to receive certain kinds of material and operative under movement through the body of the material in said container, to receive certain kinds of material and to discharge the same at points higher up and at the same sides of the plate at which it was received into said pockets, and means operative between the plates to receive the materials discharged from said pockets and to maintain the separation of the materials thus effected.

5. A grain separator comprising a container for the grain, and a rotary disk provided with pockets that are always closed at their inner side but open at their outer sides and adapted to receive certain kinds of grain in their movement through the body of grain in said container and to discharge the same at points higher up, and at the same side of the disk at which it is received into said pockets, and a spout located at the same side of the disk at which the grain was received into said pockets and adjacent to the face of the disk, for catching the grain as it falls from the upper pockets.

6. A separator of the kind described comprising a container for the grain, and a plurality of closely adjacent disks mounted to rotate on a common approximately horizontal axis, said disks, on their opposing faces having pockets adapted to receive certain kinds of grain in their movement through the body of grain, and to discharge the same, at points higher up, back into the space between said opposing pocketed faces of the disks.

7. A separator of the kind described comprising a container for the grain, and a plurality of closely adjacent disks mounted to rotate on a common approximately horizontal axis, the said disks on their opposing faces having pockets adapted to receive certain kinds of grain and to reject other kinds of grain, the pocketed surfaces of said disks being arranged to run partly immersed in the grain, and means located between said disks for catching the grain falling from the upper pockets and for maintaining the separation thus effected.

8. A separator of the kind described comprising a container for the grain, and a plurality of closely adjacent disks mounted to rotate on a common approximately horizontal axis, the said disks on their opposing faces having pockets adapted to receive certain kinds of grain and to reject other kinds of grain, the pocketed surfaces of said disks being arranged to run partly immersed in the grain, and means for discharging the grain from the upper pockets and for maintaining the separation thus effected.

9. In a separator of the kind described, the combination with a container for the material to be separated, of a plurality of closely positioned disks arranged to rotate on a common approximately horizontal axis and provided in their opposing faces with pockets adapted to receive certain kinds of material and to reject other kinds of material in their movement through the body of grain in said container, and a trough positioned between the upper portions of the opposing pocketed faces of said disks, to receive the grain discharged from the opposing upper pockets of the disk.

10. In a separator of the kind described, the combination with a container for the material to be separated, of a plurality of closely positioned disks arranged to rotate on an approximately horizontal axis and provided in their faces with pockets adapted to receive certain kinds of material and to reject other kinds of material, the pocketed surfaces of said disks being arranged to run partly immersed in the said material to be separated, and means for causing the material to progressively move through said receptacle in a direction from the first toward the last of said disks.

11. In a separator of the kind described, the combination with a container for the material to be separated, of a plurality of closely positioned disks arranged to rotate on an approximately horizontal axis and provided in their faces with pockets adapted to receive certain kinds of material and to reject other kinds of material, the pocketed surfaces of said disks being arranged to run partly immersed in the said material to be separated, and means operative between the disks for ejecting the material from the upper pockets and for maintaining the separation thus effected.

In testimony whereof I affix my signature in presence of two witnesses.

CLARENCE W. CARTER.

Witnesses:
CLARA DEMAREST,
BERNICE G. BAUMANN.